United States Patent
Lahr et al.

(10) Patent No.: US 12,428,570 B2
(45) Date of Patent: Sep. 30, 2025

(54) WATER-BASED INKS FOR THERMOFORMING APPLICATIONS

(71) Applicant: SUN CHEMICAL CORPORATION, Parsippany, NJ (US)

(72) Inventors: Alexander Lahr, Rock Hill, SC (US); Bruce Marshall, Fort Mill, SC (US)

(73) Assignee: Sun Chemical Corporation, Parsippany, NJ (US)

( * ) Notice: Subject to any disclaimer, the term of this patent is extended or adjusted under 35 U.S.C. 154(b) by 759 days.

(21) Appl. No.: 15/743,009

(22) PCT Filed: Jul. 6, 2016

(86) PCT No.: PCT/US2016/041067
§ 371 (c)(1),
(2) Date: Jan. 9, 2018

(87) PCT Pub. No.: WO2017/011236
PCT Pub. Date: Jan. 19, 2017

(65) Prior Publication Data
US 2019/0085191 A1    Mar. 21, 2019

Related U.S. Application Data

(60) Provisional application No. 62/193,206, filed on Jul. 16, 2015.

(51) Int. Cl.
| | | |
|---|---|---|
| *C09D 11/107* | (2014.01) | |
| *C09D 7/61* | (2018.01) | |
| *C09D 7/63* | (2018.01) | |
| *C09D 7/65* | (2018.01) | |
| *C09D 11/023* | (2014.01) | |
| *C09D 11/037* | (2014.01) | |
| *C09D 11/106* | (2014.01) | |
| *C09D 11/12* | (2006.01) | |
| *C09D 125/06* | (2006.01) | |
| *C09D 133/10* | (2006.01) | |
| *C08K 3/22* | (2006.01) | |
| *C08L 83/04* | (2006.01) | |

(52) U.S. Cl.
CPC .............. *C09D 11/107* (2013.01); *C09D 7/61* (2018.01); *C09D 7/63* (2018.01); *C09D 7/65* (2018.01); *C09D 11/023* (2013.01); *C09D 11/037* (2013.01); *C09D 11/106* (2013.01); *C09D 11/12* (2013.01); *C09D 125/06* (2013.01); *C09D 133/10* (2013.01); *C08K 3/22* (2013.01); *C08K 2003/2296* (2013.01); *C08L 83/04* (2013.01)

(58) Field of Classification Search
CPC .. C09D 11/107; C09D 11/106; C09D 133/10; C09D 125/06; C09D 11/037; C09D 11/023; C09D 7/63; C09D 7/61; C09D 7/65; C09D 11/12; C08L 83/04; C08K 2003/2296; C08K 3/22
See application file for complete search history.

(56) References Cited

U.S. PATENT DOCUMENTS

| | | | | |
|---|---|---|---|---|
| 4,013,479 A | * | 3/1977 | Biddle ................... | D21H 17/62 106/236 |
| 4,096,262 A | * | 6/1978 | Andrews .............. | A61K 9/0017 514/250 |
| 5,171,404 A | * | 12/1992 | Ellis ..................... | D21G 1/0253 162/290 |
| 5,286,774 A | * | 2/1994 | McGibbon ............. | C09D 11/10 524/382 |
| 5,384,160 A | * | 1/1995 | Frazzitta .............. | B41M 7/0045 427/407.1 |
| 5,585,192 A | * | 12/1996 | Sharma .................... | C08K 5/17 428/500 |
| 5,804,287 A | | 9/1998 | Hatakeyama et al. | |
| 5,889,083 A | * | 3/1999 | Zhu ........................ | C09D 11/30 523/161 |
| 6,133,342 A | * | 10/2000 | Mizobuchi .............. | B41M 5/24 523/161 |
| 2002/0025863 A1 | * | 2/2002 | Irii ...................... | A63B 37/0003 473/377 |
| 2002/0040660 A1 | * | 4/2002 | Momose .............. | C09D 11/322 106/31.75 |
| 2004/0013892 A1 | * | 1/2004 | Yano ........................ | C08J 7/043 428/480 |
| 2005/0036956 A1 | * | 2/2005 | Fei .......................... | A61K 8/90 424/53 |
| 2005/0038181 A1 | * | 2/2005 | Chopra .................. | A61K 8/891 524/588 |
| 2006/0188321 A1 | * | 8/2006 | Nakamura ........... | C09D 11/037 401/214 |
| 2007/0148414 A1 | * | 6/2007 | Halfyard .................. | G03G 8/00 428/195.1 |

(Continued)

FOREIGN PATENT DOCUMENTS

JP          S61-66641 A       4/1986

OTHER PUBLICATIONS

Product Bulleting—TYZOR TPT, Dorf Ketal Chemicals, LLC, pp. 1-2.*
BASF—JONCRYL 1695, pp. 1-2, Mar. 23, 2007, BASF Corporation.*
BYK-348 Data Sheet, p. 1-2, BYK USA Inc, Apr. 2013.*
International Preliminary Report on Patentability issued in International Application No. PCT/US2016/041067, mailed Jan. 16, 2018.
International Search Report issued in International Application No. PCT/US16/41067, mailed Sep. 16, 2016.

(Continued)

*Primary Examiner* — Alexander C Kollias
(74) *Attorney, Agent, or Firm* — Marian E. Fundytus; Amster Rothstein & Ebenstein LLP

(57) ABSTRACT

The present invention provides water-based thermoformable printing inks and coatings. The inks and coatings of the invention comprise one or more acrylic emulsions, one or more styrene acrylic emulsions, an adhesion promoter, and water.

17 Claims, No Drawings

(56) References Cited

U.S. PATENT DOCUMENTS

| | | |
|---|---|---|
| 2010/0013651 A1 | 1/2010 | Spalink et al. |
| 2011/0045306 A1 | 2/2011 | Johnson et al. |
| 2011/0177251 A1* | 7/2011 | Boyd .................... C03C 17/005 |
| | | 427/389.7 |
| 2011/0234728 A1* | 9/2011 | Aoki .................... B41M 5/0011 |
| | | 347/102 |
| 2012/0046408 A1 | 2/2012 | Minkwitz |
| 2019/0284376 A1* | 9/2019 | Cooke .................... C08F 10/02 |

OTHER PUBLICATIONS

Written Opinion of the International Searching Authority issued in International Application No. PCT/US16/41067, mailed Sep. 16, 2016.

Extended European Search Report issued in counterpart EP Application No. 16824901.9, mailed Dec. 13, 2018.

* cited by examiner

WATER-BASED INKS FOR THERMOFORMING APPLICATIONS

CROSS REFERENCE TO RELATED APPLICATIONS

The present application is a § 371 National Phase application based on PCT/US2016/041067 filed Jul. 6, 2016, which claims the benefit of U.S. Provisional Application No. 62/193,206, filed Jul. 16, 2015 the subject matter of each of which is incorporated by reference in their entirety.

FIELD OF THE INVENTION

The present invention is generally related to thermoformable printing inks. Disclosed are water-based acrylic thermoformable inks.

BACKGROUND

Thermoforming processes typically involve vacuum forming, heat bending, or folding of a plastic substrate into a three dimensional object. Inks printed on the substrates must be able to withstand the rigors of thermoforming. The substrate may be heated to a temperature of about 200° C. to about 700° C. During the thermoforming process, the ink image continuously elongates at the same rate as the plastic substrate to produce a three dimensional product with printed graphics or text. The printed ink image must be uniform and without cracking after the thermoforming process.

Products that can be made via thermoforming include, but are not limited to, containers and packages, lids, graphic displays, in-molded electronic devices, molded car parts, etc.

Suitable substrates for thermoformed objects include high density polyolefin films. For example, polyethylene (PE), polyethylene terephthalate (PET), oriented polypropylene (OPP), and oriented polyamide (OPA) can be used.

Typically, thermoformable inks have generally been solvent-based or UV curable. There are few examples of water-based thermoformable inks. The water-based thermoformable inks currently available generally contain polypropylene resin grafted with maleic acid, polyether urethane resin, and/or ethylene-vinyl acetate copolymer resin.

It has generally been thought that water-based thermoformable inks could not be made using acrylics. It was typically believed that such inks would be brittle, lack heat resistance, and/or would not be able to form a sufficient bond to the film.

At the time of this application, all customers reported printing for this end-use application using solvent-based inks, which result in higher VOC (volatile organic compound) emissions. Previous attempts to use water-based inks had resulted in failure due to poor adhesion to the substrate, poor heat resistance or cracking during the molding process. Thus, there is still a need for water-based thermoformable inks and coatings.

SUMMARY OF THE INVENTION

The present invention provides thermoformable water-based acrylic inks and coatings. The inks and coatings of the invention are suitable for printing on polyolefinic substrates that are subsequently thermoformed. The inks and coatings of the invention can be heated and stretched to at least twice the length of the original substrate, without any cracking. The inks and coatings of the invention have good adhesion, are rub resistant, and are scratch resistant.

In a particular aspect, the present invention provides a thermoformable water-based printing ink or coating composition comprising:
 a) 1 wt % to 60 wt % one or more acrylic emulsions;
 b) 5 wt % to 15 wt % one or more styrene acrylic emulsions;
 c) 0.1 wt % to 10 wt % adhesion promoter; and
 d) water.

The present invention further provides a thermoformed article comprising the thermoformable water-based printing ink or coating of the invention.

In another aspect, the present invention provides a method of decorating a thermoformed article, comprising the steps of:
 a) providing a substrate suitable for thermoforming;
 b) applying to the substrate the thermoformable water-based printing ink or coating of the invention;
 c) drying the thermoformable water-based printing ink or coating;
 d) heating the printed substrate to its softening point;
 e) deforming the printed substrate; and
 f) allowing the deformed printed substrate to cool.

DETAILED DESCRIPTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

The present invention relates to thermoformable water-based inks and coatings that are a blend of acrylic and styrene acrylic emulsions. The inks and coatings of the invention are suitable for printing on any substrate that can subsequently be thermoformed, such as polyolefinic substrates. Suitable substrates, include, but are not limited to, polyethylene (PE), polyethylene terephthalate (PET), polypropylene (PP), oriented polypropylene (OPP), polyamide (PA), and oriented polyamide (OPA), and the like.

Through this blend of acrylic resins, styrene acrylic resins, and additives, the water-based thermoformable inks and coatings of the invention achieve the adhesion to the substrate, heat resistance, and elasticity necessary for the thermoforming process. Previously, only solvent-based or UV curable inks were able to achieve these properties.

In a particular aspect, the present invention provides a thermoformable water-based printing ink or coating composition comprising:
 a) 1 wt % to 60 wt % one or more acrylic emulsions;
 b) 5 wt % to 15 wt % one or more styrene acrylic emulsions;
 c) 0.1 wt % to 10 wt % adhesion promoter; and
 d) water.

The present invention further provides a thermoformed article comprising the thermoformable water-based printing ink or coating of the invention.

In another aspect, the present invention provides a method of decorating a thermoformed article, comprising the steps of:
a) providing a substrate suitable for thermoforming;
b) applying to the substrate the thermoformable water-based printing ink or coating of the invention;
c) drying the thermoformable water-based printing ink or coating;
d) heating the printed substrate to its softening point;
e) deforming the printed substrate; and
f) allowing the deformed printed substrate to cool.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, the terms "thermoformable water-based inks and coatings," "thermoformable water-based inks and coatings of the invention," "water-based thermoformable inks and coatings," "water-based thermoformable inks and coatings of the invention," "inks and coatings of the invention," "inks of the invention" and "coatings of the invention" may be used interchangeably.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

Throughout this disclosure, all parts and percentages are by weight (wt % or mass % based on the total weight) and all temperatures are in ° C. unless otherwise indicated.

Water-Based Thermoformable Inks and Coatings

The water-based thermoformable inks and coatings of the invention comprise one or more acrylic emulsions, one or more styrene acrylic emulsions, one or more adhesion promoters, and water. The water-based thermoformable inks and coatings of the invention may further comprise one or more colorants (typically dispersed in an acrylic emulsion), one or more silicone compounds, one or more waxes, and one or more crosslinkers.

The water-based thermoformable inks and coatings of the invention preferably comprise about 1 wt % to about 60 wt % of one or more acrylic emulsions, based on the total weight of the ink or coating. For example, the acrylic emulsions may be present in the water-based thermoformable inks and coatings of the invention in an amount of about 1 wt % to about 55 wt %; or about 1 wt % to about 50 wt %; or about 1 wt % to about 45 wt %; or about 1 wt % to about 30 wt %; or about 1 wt % to about 25 wt %; or about 1 wt % to about 20 wt %; or about 1 wt % to about 10 wt %; or about 5 wt % to about 55 wt %; or about 5 wt % to about 50 wt %; or about 5 wt % to about 45 wt %; or about 5 wt % to about 30 wt %; or about 5 wt % to about 25 wt %; or about 5 wt % to about 20 wt %; or about 10 wt % to about 55 wt %; or about 10 wt % to about 50 wt %; or about 10 wt % to about 45 wt %; or about 10 wt % to about 25 wt %; or about 15 wt % to about 55 wt %; or about 15 wt % to about 50 wt %; or about 15 wt % to about 45 wt %; or about 20 wt % to about 50 wt %; or about 20 wt % to about 45 wt %.

Suitable acrylic emulsions include, but are not limited to: Joncryl 585, Joncryl HR 1620, Joncryl 1695, and, all from BASF; Vancryl K762 (toll manufactured by Allnex for Sun Chemical); Rhoplex® I-2183 and Rhoplex® I-545, from Dow; Neocryl BT 101, from DSM; combinations thereof; and the like.

The water-based thermoformable inks and coatings of the invention preferably comprise about 5 wt % to about 15 wt % of one or more styrene acrylic emulsions, based on the total weight of the ink or coating. For example, the styrene acrylic emulsions may be present in the water-based thermoformable inks and coatings of the invention in an amount of about 5 wt % to about 14 wt %; or about 5 wt % to about 12 wt %; or about 5 wt % to about 10 wt %; or about 7 wt % to about 15 wt %; or about 7 wt % to about 14 wt %; or about 7 wt % to about 10 wt %.

Suitable styrene acrylic emulsions include, but are not limited to: LPV-1002 from KC Colors; Acronal S728, Acronal NX4533, and Acronal S888S, from BASF; Rovene® 6119 and Rovene® 6066 from Mallard Creek Polymers; Induprint SE 196, Induprint SE 284, Induprint SE 288, Induprint SE 2942, Induprint SE 295, and Induprint SE 2954, from Indulor; combinations thereof; and the like.

The water-based thermoformable inks and coatings of the invention preferably comprise about 0.1 wt % to about 10 wt % of one or more adhesion promoters, based on the total weight of the ink composition. For example, the one or more adhesions promoters may be present in an amount of about 0.1 wt % to about 8 wt %; or from about 0.1 wt % to about 5 wt %; or from about 0.5 wt % to about 10 wt %; or from about 0.5 wt % to about 8 wt %; or from about 0.5 wt % to about 5 wt %. For example, the one or more adhesion promoters may be present in an amount of about 1 wt % to about 6 wt %.

Suitable adhesion promoters include, but are not limited to, polyolefins, maleated polyolefins, sulfonamides, organic titanates, combinations thereof, and the like.

The water-based thermoformable inks and coatings of the invention preferably comprise water in an amount of about 1 wt % to about 50 wt %, based on the total weight of the ink or coating composition. For example, water may be present in an amount of from about 1 wt % to about 45 wt %; or from about 1 wt % to about 40 wt %; or from about 1 wt % to about 30 wt %; or from about 1 wt % to about 25 wt %; or from about 1 wt % to about 20 wt %; or from about 1 wt % to about 15 wt %; or from about 1 wt % to about 10 wt %; or from about 5 wt % to about 50 wt %; or from about 5 wt % to about 45 wt %; or from about 5 wt % to about 40 wt %; or from about 5 wt % to about 30 wt %; or from about 5 wt % to about 25 wt %; or from about 5 wt % to about 20 wt %; or from about 5 wt % to about 15 wt %. The water used may be of any suitable type, such as, for example, tap water, de-ionized water, distilled water, or spring water.

The water-based thermoformable inks and coatings of the invention may further comprise one or more waxes. Suitable waxes include, but are not limited to: polyethylene wax;

polytetrafluoroethylene wax (Teflon) such as SST-3 from Shamrock; paraffin wax; polypropylene wax; amide wax; erucamide wax; carnauba wax; combinations thereof; and the like. Preferably, waxes are present in the water-based thermoformable inks and coatings of the invention in an amount of about 0 wt % to 5 wt %, based on the total weight of the ink or coating. For example, waxes can be present in an amount of from about 0.1 wt % to about 5 wt %; or from about 0.1 wt % to about 3 wt %; or from about 0.1 wt % to about 2 wt %; or from about 0.1 wt % to about 1 wt %; or from about 0.5 wt % to about 5 wt %; or from about 0.5 wt % to about 3 wt %; or from about 0.5 wt % to about 2 wt %; or from about 0.5 wt % to about 1 wt %.

The water-based thermoformable inks and coatings of the present invention may further comprise one or more silicones. Silicones include octamethylcyclotetrasiloxanes and polydimethylsiloxanes. Suitable silicones include, but are not limited to: DC51 and Dow Corning® HV-495, both from Dow Corning; Siltech E-600, E-660, and E-2141, all from Siltech; combinations thereof; and the like.

The silicones are preferably present in an amount of about 0 wt % to about 5 wt %. For example, the silicones may be present in an amount of about 0.1 wt % to about 5 wt %; or from about 0.1 wt % to about 4 wt %; or from about 0.1 wt % to about 3 wt %; or from about 0.1 wt % to about 2 wt %; or from about 0.1 wt % to about 1 wt %; or from about 0.5 wt % to about 5 wt %; or from about 0.5 wt % to about 4 wt %; or from about 0.5 wt % to about 3 wt %; or from about 0.5 wt % to about 2 wt %; or from about 0.5 wt % to about 1 wt %.

The water-based thermorformable inks and coatings of the invention do not require the use of a silicone compound. Even without the use of the silicone, the inks and coatings of the present invention provide product performance equal to commercially available inks for the same end use.

The water-based thermoformable inks and coatings of the present invention may further comprise one or more crosslinkers. Preferably, crosslinkers are present in an amount of 0 wt % to about 5.0 wt %, based on the total weight of the ink or coating composition. For example, crosslinkers may be present in an amount of about 0.1 wt % to about 5 wt %; or from about 0.1 wt % to about 4 wt %; or from about 0.1 wt % to about 3 wt %; or from about 0.1 wt % to about 2 wt %; or from about 0.1 wt % to about 1 wt %; or from about 0.5 wt % to about 5 wt %; or from about 0.5 wt % to about 4 wt %; or from about 0.5 wt % to about 3 wt %; or from about 0.5 wt % to about 2 wt %; or from about 0.5 wt % to about 1 wt %.

Suitable crosslinkers include, but are not limited to, zinc oxides; zirconium crosslinkers, such as ammonium zirconium carbonate; combinations thereof, and the like.

The water-based thermoformable inks and coatings of the invention may further include one or more additional polymers, one or more oxygen-containing water-tolerant solvents, one or more organic or inorganic pigments or dyes, and pigment dispersants.

The additional polymer may optionally be included in the ink formulations to improve wet ink film properties like wetting and flow, and/or dry film properties such as gloss, adhesion, rub resistance, and mar resistance. Suitable additional polymers include, but are not limited to, alkyd, rosinated alkyd, polyester, acrylic, melamine-formaldehyde, urea-formaldehyde, polyester-urethane and urethane, combinations thereof, and the like. When used, the additional polymer is preferably present in an amount of about 1 wt % to about 10 wt %, based on the total weight of the ink or coating composition. For example, the additional polymer may be present in an amount of about 1 wt % to about 8 wt %; or about 1 wt % to about 5 wt %; or about 2 wt % to about 10 wt %; or about 2 wt % to about 8 wt %; or about 2 wt % to about 5 wt %.

The one or more oxygen-containing water-tolerant solvents may be used to adjust drying speed and also enhance foam control. Suitable oxygen-containing water-tolerant solvents include, but are not limited to, 1-propoxy-2-propanol, n-propanol, isopropanol, ethyl alcohol and other lower alcohols, combinations thereof, and the like. When used, the one or more oxygen-containing water-tolerant solvents are preferably used in an amount of 1 wt % to about 5 wt %, based on the total weight of the ink or coating composition. For example, the one or more oxygen-containing water-tolerant solvents may be present in an amount of about 1 wt % to about 4 wt %; or about 1 wt % to about 3 wt %; or about 1 wt % to about 2 wt %; or about 2 wt % to about 5 wt %; or about 2 wt % to about 4 wt %.

The water-based thermoformable inks and coatings of the invention may further comprise one or more colorants. Suitable colorants include, but are not limited to, organic or inorganic pigments, and dyes. Dyes include, but are not limited to, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7; combinations thereof; and the like. Other organic and inorganic pigments and dyes can also be employed, as well as combinations that achieve the colors desired. Preferably, the colorant will be in the form of an acrylic resin dispersion, but could also be in the form of one or more dispersions based on different resins, one or more dyes, one or more surfactant-based materials, one or more dry organic or inorganic pigments, combinations thereof, and the like. For example, Flexiverse® III Blue 15:3, Heubach BWP1530 Blue PB15:3, Flexiverse High Gloss Black, Flexiverse Yellow 14, or Flexiverse Green 7 could be used as a colorant.

When used, the one or more colorants are present in an amount of about 0.01 wt % to about 70 wt %. For example, the one or more colorants may be present in an amount of 0.01 wt % to about 65 wt %; or about 0.01 wt % to about 60 wt %; or about 0.01 wt % to about 50 wt %; or about 0.01 wt % to about 25 wt %; or about 0.01 wt % to about 10 wt %; or about 0.01 wt % to about 5 wt %; or about 0.1 wt % to about 70 wt %; or 0.1 wt % to about 65 wt %; or about 0.1 wt % to about 60 wt %; or about 0.1 wt % to about 50 wt %; or about 0.1 wt % to about 25 wt %; or about 0.1 wt % to about 10 wt %; or about 0.1 wt % to about 5 wt %; or about 0.5 wt % to about 70 wt %; or about 0.5 wt % to about 65 wt %; or about 0.5 wt % to about 60 wt %; or about 0.5 wt % to about 55 wt %; or about 0.5 wt % to about 50 wt %; or about 0.5 wt % to about 45 wt %; or about 0.5 wt % to about 40 wt %; or about 0.5 wt % to about 35 wt %; or about 0.5 wt % to about 30 wt %; or about 0.5 wt % to about 25 wt %; or about 0.5 wt % to about 20 wt %; or about 0.5 wt % to about 15 wt %; or about 0.5 wt % to about 10 wt %; or about 0.5 wt % to about 5 wt %; or about 5 wt % to about 70 wt %; or about 5 wt % to about 65 wt %; or about 5 wt % to about 60 wt %; or about 5 wt % to about 55 wt %; or about 5 wt % to about 50 wt %; or about 5 wt % to about 45 wt %; or about 5 wt % to about 40 wt %; or about 5 wt % to about 35 wt %; or about 5 wt % to about 30 wt %; or about 5 wt % to about 25 wt %; or about 5 wt % to about 20 wt %; or about 5 wt % to about 15 wt %; or about 5 wt % to about 10 wt %.

The thermoformable water-based inks and coatings of the invention may further comprise one or more additives typically used in printing inks. Such additives include, but are not limited to, talc, defoamers, stabilizers, rheological modifiers, plasticizers, light stabilizers, de-gassing additives, flow promoters, antioxidants, surfactants, and combinations thereof. When used, the one or more additives are preferably present in an amount of about 0 wt % to about 5 wt %, based on the total weight of the ink or coating composition. For example, the one or more additives may be present in an amount of about 0.1 wt % to about 5 wt %; or from about 0.1 wt % to about 4 wt %; or from about 0.1 wt % to about 3 wt %; or from about 0.1 wt % to about 2 wt %; or from about 0.1 wt % to about 1 wt %; or from about 0.5 wt % to about 5 wt %; or from about 0.5 wt % to about 4 wt %; or from about 0.5 wt % to about 3 wt %; or from about 0.5 wt % to about 2 wt %; or from about 0.5 wt % to about 1 wt %.

In one embodiment, the vehicle used for the water-based inks and coatings intended for use on heavy gauge film used for thermal forming containers and lids is preferably comprised of two acrylic emulsion polymers (such as in Example 1 below), polytetrafluoroethylene powder, a silicone compound, zinc oxide crosslinker, defoamer, and water. This blend vehicle is then blended with colorant/pigment dispersions made with acrylic resin solution at a level of 0.1 wt % to 70 wt % colorant dispersion, and vehicle at a level of 30 wt % to 99.9 wt %, to form a finished ink or coating.

The water-based thermoformable inks and coatings of the invention preferably provide heat resistance, impact resistance, and resistance to cracking upon elongation of the film. The properties included are those involved with the thermoforming process for converting the printed material into lids and containers. The inks and coatings of the invention may be applied as a single color, or as one or two colors printed over the first down color. The inks and coatings of the present invention are designed for applications that require good machining properties involved with the formation of lids and containers through heating and molding, but may also be used for other applications that require similar ink properties.

The chemistry underlying the inks and coatings of the present invention is different to that known in the art. The formulas are a combination of a cross-linkable acrylic emulsions, a pH sensitive crosslinker, additives for jaw release (such as polytetrafluoroethylene wax, silicones, or talc), and acrylic resins as dispersant for the pigments. Jaw release refers to the ability of the ink on the printed substrate to release from the metal component of equipment used to seal pieces of the printed material together or used in the molding of this material into different shapes. Examples would be sealing a polyethylene lined bag like a potato chip bag or the molding of a piece of plastic into a cup or lid. Good jaw release means no sticking, or minimal sticking occurs.

The finished ink is preferably applied using a flexographic press on high-density film. Inks may be applied at a coating weight ranging from 0.3 to 2.0 pounds per ream, using a photopolymer or styrene-butadiene rubber (SBR) printing plate. The inks and coatings of the invention can be printed by any printing means. For example, the viscosity and rheology of the inks and coatings could be adjusted for use in gravure, lithographic, inkjet, and screen printing processes, and the like.

EXAMPLES

The following examples illustrate specific aspects of the present invention, and are not intended to limit the scope thereof in any respect, and should not be so construed.

General Formulation

The water-based thermoformable inks and coatings of the invention can be made according to the formulation shown in Table A. However, it is to be understood that the specific components listed can be replaced with other suitable materials as described above. Inks were mixed in a Caframo laboratory mixer with a paddle blade. The pigment dispersion was placed in the container first. While mixing, the water, vehicle, and additives were added slowly. After the last ingredient was added, the ink was mixed for 5 to 15 minutes, until uniformly dispersed.

It is to be understood that when no colorant (i.e. pigment or dye) is used, the vehicle itself can be used as the water-based thermoformable ink or coating. In such instance, the total weight of the vehicle would be the total weight of the ink, and the amounts of the components would be adjusted to the amounts as described herein above.

TABLE A

| Sample formulation | |
|---|---|
| Material | % Range |
| Flexiverse ® Pigment Dispersions (Sun Chemical) | 0.01-70 |
| Water | 1-70 |
| Example 1 vehicle | 5-70 |
| Advantis 510W (adhesion promoter) | 1-8 |
| Dow 51 Additive (silicone) | 0-2 |

Example 1. Vehicle Used for Preparing Thermoforming Inks

The formulation of the vehicle used to formulate the finished inks is shown in Table 1 below.

TABLE 1

| Formulation of vehicle | |
|---|---|
| Material | % |
| Joncryl 585 (BASF) | 71.20 |
| LPV-1002 (KC Colors) | 17.50 |
| DEE FO PI-40 (Munzing) | 0.35 |
| SST-3 (Shamrock) | 2.00 |
| Dow 51 Additive (Dow Corning) | 0.50 |
| Liquilink 901 (Lubrizol) | 6.00 |
| Tap Water | 2.45 |
| Total | 100.00 |

Example 2. Water-Based Black Finished Ink

A water-based thermoformable black finished ink was prepared according to the formulation shown in Table 2.

TABLE 2

| Material | % |
| --- | --- |
| *Water-based black finished ink* | |
| Example 1 vehicle | 40.00 |
| Hi Opacity/Hi Opacity White | 2.00 |
| Flexiverse High Gloss Black Disp. (Sun Chemical) | 45.00 |
| Advantis 510W (Eastman) | 5.00 |
| Dow 51 Additive | 0.50 |
| Tap Water | 7.50 |
| Total | 100.00 |

Example 3. Water-Based Dark Green Finished Ink

A water-based thermoformable dark green finished ink was prepared according to the formulation shown in Table 3.

TABLE 3

| Material | % |
| --- | --- |
| *Water-based dark green finished ink* | |
| Example 1 vehicle | 65.00 |
| Hi Opacity/Hi Opacity White | 8.00 |
| Flexiverse ® Yellow 14 (Sun Chemical) | 6.00 |
| Flexiverse ® III Blue 15:3 (Sun Chemical) | 5.00 |
| Advantis 510W | 5.00 |
| Dow 51 Additive | 0.50 |
| Tap Water | 10.50 |
| Total | 100.00 |

Example 4. Water-Based Light Green Finished Ink

A water-based thermoformable light green finished ink was prepared according to the formulation shown in Table 4.

TABLE 4

| Material | % |
| --- | --- |
| *Water-based light green finished ink* | |
| Example 1 vehicle | 50.00 |
| Hi Opacity/Hi Opacity White | 18.00 |
| Flexiverse ® Yellow 14 | 12.00 |
| Flexiverse ® Green 7 (Sun Chemical) | 7.00 |
| Advantis 510W | 5.00 |
| Dow 51 Additive | 0.50 |
| Tap Water | 7.50 |
| Total | 100.00 |

Prior to printing, the viscosity of the ink samples was adjusted with water. The inks were run at a viscosity between 22 to 25 seconds on a #2 EZ Zahn cup.

Preparation of Prints for Testing

The film substrate (PET) was placed on a smooth, flat surface. Approximately 0.5 grams of ink was applied to a 360-line/6.9 bcm volume Pamarco 2-roll handproofer with a 40/45 durometer rubber roller. The handproofer was pulled across the substrate, transferring the ink from the handproofer to the substrate. The prepared print was dried using a forced air heat gun, with four quick passes over the print, to simulate drying that occurs on press. The print was aged for 30 minutes, and then tested as described below.

Tape Adhesion

The tacky side of a 4 inch strip of 610 tape was placed flat on the surface of the printed substrate. The tape was then ripped from the print and examined for ink transfer from the surface.

A pass for the adhesion test was that no more than 10% of ink was removed from the substrate. All inks passed the adhesion testing.

Scratch Resistance

Scratch resistance was tested by rubbing a finger nail in a back and forth motion across the printed substrate for 10 cycles. The prints were examined for ink removal, and ink transfer from the printed substrate to the finger nail.

A pass for the scratch resistance test was that no more than 10% of ink was removed from the substrate. All inks passed the scratch resistance test.

Thermoforming

The print sample was taped to a flat bench top with a 500 gram weight beneath the print. A forced air heat gun was used to heat the substrate until it began to stretch over the weight. When the print was hot enough, the thermoforming process was simulated by stamping the print over the 500 gram weight with a 4 ounce jar lid. The print was stretched to twice the length of the original form (i.e. 100% elongation).

An ink was considered to pass when there was no scuffing, cracking, or distortion of the ink, and no discoloration in the stretched area. All inks passed.

Color Strength

Prior to thermoforming, the color strength of the printed ink sample was measured using a spectrophotometer (e.g. SpectroEye). The xyz-weighted absolute color strength of the printed ink ($K/S_{standard}$) was measured. This was set as the standard.

The print was then thermoformed as described above, and stretched to twice the length of the original form. After thermoforming, the color strength of the printed ink sample was again tested. The xyz-weighted absolute color strength of the thermoformed printed ink was measured ($K/S_{sample}$), and the relative color strength compared to the standard ($DS=(K/S_{sample})/(K/S_{standard})$) was calculated. An ink was considered to have passed when the color strength of the thermoformed samples was reduced by no more than 25% compared to the standard (i.e. DS is at least 0.75). All inks passed the color strength test after thermoforming.

The sample prints of the invention were compared to commonly used solvent-based thermoforming inks. It is known that solvent-based thermoforming inks generally show no cracking while being heated and stretched, and no ink rub off from abrasion when being formed. The water-based thermoformable inks and coatings of the present invention performed as well as did the commonly used solvent-based inks.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A thermoformable water-based printing ink or coating composition comprising:
   a) 1 wt % to 60 wt % one or more acrylic emulsions;
   b) 5 wt % to 15 wt % one or more styrene acrylic emulsions;
   c) 0.1 wt % to 10 wt % adhesion promoter;
   d) 0 wt % to 5 wt % one or more oxygen-containing water-tolerant solvents, wherein the amount of oxygen-containing water-tolerant solvents is the total of all oxygen-containing water-tolerant solvents combined; and
   e) 1 wt % to 20 wt % water; and
   f) one or more silicones, in an amount of 0.1 wt % to 5 wt %; wherein the one or more silicones are selected from the group consisting of octamethylcyclotetrasiloxane, polydimethylsiloxane, and combinations thereof.

2. The thermoformable water-based printing ink or coating of claim 1, comprising 5 wt % to 55 wt % of the one or more acrylic emulsions.

3. The thermoformable water-based printing ink or coating of claim 1, comprising 5 wt % to 10 wt % of the one or more styrene acrylic emulsions.

4. The thermoformable water-based printing ink or coating of claim 1, comprising 0.5 wt % to 8 wt % of the adhesion promoter.

5. The thermoformable water-based printing ink or coating of claim 1, wherein the adhesion promoter is selected from the group consisting of polyolefins, maleated polyolefins, sulfonamides, organic titanates, and combinations thereof.

6. The thermoformable water-based printing ink or coating of claim 1, further comprising a crosslinker, in an amount of 0.1 wt % to 5 wt %.

7. The thermoformable water-based printing ink or coating of claim 6, wherein the crosslinker is selected from the group consisting of zinc oxides, zirconium crosslinkers, and combinations thereof.

8. The thermoformable water-based printing ink or coating of claim 1, further comprising a colorant, in an amount of 0.1 wt % to 70 wt %.

9. The thermoformable water-based printing ink or coating of claim 8, wherein the colorant is in the form of an acrylic dispersion.

10. The thermoformable water-based printing ink or coating of claim 1, further comprising a wax, in an amount of 0.1 wt % to 5 wt %.

11. The thermoformable water-based printing ink or coating of claim 10, wherein the wax is selected from the group consisting of amide wax, erucamide wax, polypropylene wax, paraffin wax, polyethylene wax, polytetrafluoroethylene wax, carnauba wax, and combinations thereof.

12. The thermoformable water-based printing ink or coating of claim 1, further comprising one or more additives independently selected from the group consisting of defoamers, stabilizers, rheological modifiers, plasticizers, light stabilizers, de-gassing additives, flow promoters, antioxidants, surfactants, and combinations thereof; wherein the one or more additives are present in an amount of 0.1 wt % to 5 wt %.

13. The thermoformable water-based printing ink or coating of claim 1, wherein the thermoformable water-based printing ink or coating is suitable for use in a flexographic, gravure, lithographic, or screen printing process.

14. The thermoformable water-based printing ink or coating of claim 1, further comprising polytetrafluoroethylene powder.

15. The thermoformable water-based printing ink or coating of claim 14, further comprising a silicone compound.

16. The thermoformable water-based printing ink or coating of claim 15, further comprising zinc oxide crosslinker.

17. The thermoformable water-based printing ink or coating of claim 16, further comprising defoamer.

* * * * *